United States Patent
Baker

(10) Patent No.: US 9,388,778 B2
(45) Date of Patent: Jul. 12, 2016

(54) SERVO FLOW RECIRCULATION FOR AN ADVANCED THERMAL EFFICIENT AIRCRAFT ENGINE FUEL SYSTEM

(71) Applicant: Carthel C. Baker, Oregon, IL (US)

(72) Inventor: Carthel C. Baker, Oregon, IL (US)

(73) Assignee: Woodward, Inc., Fort Collins, CO (US)

( * ) Notice: Subject to any disclaimer, the term of this patent is extended or adjusted under 35 U.S.C. 154(b) by 326 days.

(21) Appl. No.: 13/946,121

(22) Filed: Jul. 19, 2013

(65) Prior Publication Data

US 2015/0020884 A1   Jan. 22, 2015

(51) Int. Cl.
| | |
|---|---|
| *F02C 7/22* | (2006.01) |
| *F02M 37/00* | (2006.01) |
| *F02C 7/232* | (2006.01) |

(52) U.S. Cl.
CPC ............. *F02M 37/0052* (2013.01); *F02C 7/22* (2013.01); *F02C 7/232* (2013.01); *F02M 37/0047* (2013.01); *F05D 2270/64* (2013.01); *Y10T 137/0318* (2015.04); *Y10T 137/85986* (2015.04); *Y10T 137/87917* (2015.04)

(58) Field of Classification Search
CPC ........ F02C 7/22; F02C 7/232; F05D 2270/64; Y10T 137/87917
USPC .......................................................... 60/484
See application file for complete search history.

(56) References Cited

U.S. PATENT DOCUMENTS

| | | | | |
|---|---|---|---|---|
| 3,303,753 | A | * | 2/1967 | McCay, Jr. ...................... 91/520 |
| 3,713,296 | A | * | 1/1973 | Black ............................... 60/452 |
| 3,774,696 | A | * | 11/1973 | Horsch ......................... 172/812 |
| 3,790,105 | A | * | 2/1974 | Eickman ...................... 244/12.1 |
| 4,607,486 | A | * | 8/1986 | Cole ............................... 60/734 |
| 4,757,747 | A | * | 7/1988 | Blatter et al. ................... 91/362 |
| 6,381,946 | B1 | | 5/2002 | Wernberg et al. |
| 6,487,847 | B1 | * | 12/2002 | Snow et al. ...................... 60/235 |
| 2003/0136103 | A1 | * | 7/2003 | Reuter et al. ................. 60/39.08 |
| 2006/0021324 | A1 | * | 2/2006 | Eick et al. .................... 60/39.281 |
| 2009/0199823 | A1 | | 8/2009 | Mahoney et al. |
| 2009/0235631 | A1 | * | 9/2009 | Bocquet et al. ............. 60/39.08 |
| 2009/0320444 | A1 | * | 12/2009 | Nouhaud ..................... 60/226.2 |
| 2010/0132368 | A1 | | 6/2010 | Lawrence et al. |

FOREIGN PATENT DOCUMENTS

| | | |
|---|---|---|
| EP | 0 802 310 A2 | 10/1997 |
| JP | 2004044503 A | 2/2004 |

* cited by examiner

*Primary Examiner* — Kevin Murphy
(74) *Attorney, Agent, or Firm* — Reinhart Boerner Van Deuren P.C.

(57) ABSTRACT

A fuel circulation system and methods are provided. The system includes a supply pump for providing an outlet flow of fuel. The system also includes at least a first and a second servo. The first servo is connected to an outlet of the supply pump. A flow regulation device is interposed between the first and second servos. At least a portion of the outlet flow from the supply pump is directed through the first servo, flow regulation device, and second servo and is returned to an inlet of the supply pump.

8 Claims, 4 Drawing Sheets

SERVO FLOW RECIRCULATION FOR AN ADVANCED THERMAL EFFICIENT AIRCRAFT ENGINE FUEL SYSTEM

FIELD OF THE INVENTION

This invention generally relates to aircraft fuel circulation systems, and more particularly to fuel flow recirculation of one or more electro-hydraulic servo valves of a fuel system.

BACKGROUND OF THE INVENTION

A typical aircraft engine fuel system includes a fuel supply arrangement that includes a boost pump, and a supply pump. The supply arrangement provides an outlet flow of fuel that may be used in one or more metering circuits each of which are responsible for metering fuel in a combustion engine, and/or an outlet flow of fuel that may be used for other functions, e.g. actuator control. In the context of metering circuits, the metering of fuel in each metering circuit is achieved via a fuel metering valve (FMV). The control of the fuel metering valve is achieved via an electro-hydraulic servo valve (EHSV). In the context of actuator control, actuator positions are controlled via an EHSV.

Each EHSV receives an input supply of fuel which is used to hydraulically position the EHSV (also referred to herein as a "servo"). This input supply of fuel is provided from the supply pump discharge flow. Each servo also drains the input supply of fuel back the inlet side of the supply pump. This recirculation is often referred to as servo drainage. A conventional configuration of such an arrangement is shown at FIG. 8. As shown therein, a boost pump 800 is connected in series to a supply pump 802. First and second servos 804, 806 are connected in parallel to one another to the outlet of supply pump 802. Supply pump 802 provides an outlet flow at pressure Ps which then passes through a wash screen 808 such that a portion of the outlet flow from supply pump 802 is split between servos 804, 806 and is at pressure Psf. The flow passing through servos 804, 806 then drains to the inlet side of supply pump 802 at pressure Pb.

Servos 804, 806 may be indicative of separate EHSV's responsible for controlling the metering position of one or more FMV's 810. As can also be seen at FIG. 8, a discharge pressurizing valve 812 is connected to an outlet side of FMV 810. Also, a bypass valve 814 is responsible for bypassing an unused portion of the fuel flow provided by supply pump 802 to metering valve 810 back to the inlet side of supply pump 802 at pressure Pb.

Unfortunately, as the number of various servos increases, so too does the overall leakage of the system. In order to ensure sufficient supply pump outlet flow characteristics to support engine relight, the supply pump must be sized to provide an output sufficient to accommodate a relight event as well as accommodate for the total servo leakage of the system. Where an overall high servo leakage is present, an oversized supply pump is often required. An oversized supply pump can lead to undesirable pump heat input to the fuel system, as any unused flow is recirculated. This recirculation heats the fuel and can negatively impact the engine's thermal management system, as well as lead to significant fuel inefficiencies.

Accordingly, there is a need in the art for an aircraft engine fuel system that substantially reduces or eliminates the need for such an oversized supply pump by more efficiently managing total servo leakage.

The invention provides such a system. These and other advantages of the invention, as well as additional inventive features, will be apparent from the description of the invention provided herein.

BRIEF SUMMARY OF THE INVENTION

The implementation of this invention is facilitated by recent combustor designs that lead to high relight pressures. Advanced combustion systems tend to lead to increased system pressure at relight and throughout the engine operating range. The relatively high relight pressure and operating pressures allow multiple servos to be run in series without requiring the supply pump differential pressure to be actively increased to support the pressure requirements of the servos.

The system described herein reduces the amount of pump flow required to operate the EHSV's by arranging the servo or groups of servos thereof in series as opposed to parallel such as that shown in the conventional arrangement of FIG. 8. As a result of this arrangement, all or at least some portion of the leakage flow from servo supply to drain that is used to hydraulically operate a first servo or group of servos is recirculated to supply additional servos or groups of servos due to their series arrangement. The drain flow from the first group is used to supply the second group and so on. This can significantly reduce the amount of pump flow required to supply the servos.

In one aspect, a fuel circulation system is provided. The system includes a supply pump for providing an outlet flow of fuel. The system also includes at least a first and a second servo. The first servo is connected to an outlet of the supply pump. A flow regulation device is interposed between the first and second servos. At least a portion of the outlet flow from the supply pump is directed through the first servo, flow regulation device, and second servo and is returned to an inlet of the supply pump.

In certain embodiments, the engine fuel system also includes a fuel metering system, wherein at least another portion of the outlet flow of fuel from the supply pump is directed to the fuel metering system.

In certain embodiments, the first servo, flow regulation device, and second servo are connected in series. The flow regulation device may be a pressure regulator that regulates an output flow from the first servo at a first pressure and provides an output flow to the second servo at a second pressure. The flow regulation device is operable to bypass a portion of the outlet flow from the first servo back to the inlet side of the supply pump.

In certain embodiments, the flow regulation device is a combined pressure regulator and switching device operable to change a flow path from the supply pump through the first and second servos between a first and a second flow configuration such that, in the first flow configuration, the first and second servos are arranged in series with one another, and in the second configuration, the first and second servo groupings are arranged in parallel with one another.

In another aspect, a fuel circulation system is provided. The system includes a supply pump for providing an outlet flow of fuel. The system also includes a plurality of servos arranged in series with one another in a first configuration. A portion of the outlet flow of passes through the plurality of servos and is recirculated to an inlet side of the supply pump.

In certain embodiments, a flow regulation device is interposed between each adjacent ones of the plurality of servos. The flow regulation device is a pressure regulator. The pressure regulator regulates an output flow from a first servo of the plurality of servos at a first pressure and provides an output flow to a second servo of the plurality of servos adjacent to the first servo at a second pressure. The pressure regular is operable to bypass a portion of the output flow from the first servo back to the inlet side of the supply pump. The second servo provides an output flow to the inlet side of the supply pump.

In certain embodiments, the flow regulation device is a combined pressure regulator and flow switching device. The combined pressure regulator and flow switching device is operable to modify a flow path between a first servo of the plurality of servos and a second servo of the plurality of servos adjacent to the first servo from the first configuration to a second configuration wherein the first servo is parallel to the second servo.

In yet another aspect, a method for controlling a flow of fuel in an engine fuel system is provided. The method includes supplying an outlet flow of fuel from a supply pump. The method also includes providing at least a portion of the outlet flow to a plurality of servos that, in a first configuration, are arranged in series with one another.

In certain embodiments, the method also includes the step of regulating a pressure of an outlet flow of a first servo of the plurality of servos with a pressure regulator interposed between the first servo and a second servo of the plurality of servos and regulating a pressure of an inlet flow to the second servo with the pressure regulator. The method also includes the step of bypassing a portion of the outlet flow from the first servo grouping through the pressure regulator back to an inlet side of the supply pump.

In certain embodiments, the method includes directing an outlet flow from the second servo back to an inlet side of the supply pump.

In certain embodiments, the method includes the step of modifying a flow path through the plurality of servos such that, in a second configuration, they are arranged in parallel to one another with a combined pressure regulator and flow switching device.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
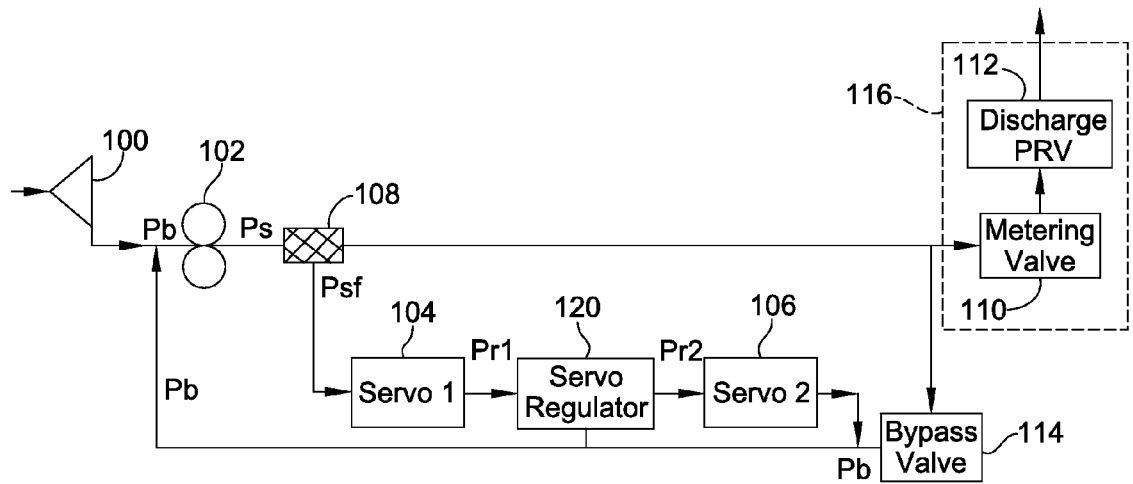
FIG. 1 is a schematic representation of a first embodiment of a fuel circulation system according to the teachings of the present invention.

Turning now to the drawings, particularly FIG. 1, the same shows one implementation of servo flow recirculation shown in a simplified fuel system. In this embodiment, a boost pump 100 is connected in series to a supply pump 102. A control arrangement which includes first and second servos 104, 106 as well as a servo regulator 120 is operably connected to an outlet of supply pump 102. First and second servos 104, 106 are connected in series to one another. In the illustrated embodiment, servo regulator 120 is interposed between servos 104, 106 and may take the form of a pressure regulation device or a combined flow and pressure regulation device. The term "servo" as used herein denotes an individual servo as well as a grouping of servos. Indeed, either of servos 104, 106 may be indicative of a plurality of servos of a fuel circulation system, and can thus each be generally considered as a servo grouping which may include one or more individual servo devices.

Supply pump 102 provides an outlet flow at pressure Ps which then passes through a wash screen 108 such that a portion of the outlet flow from supply pump 102 is provided to servos 104, 106 and servo regulator 120, and is initially at pressure Psf. The flow passing through servos 104, 106 then drains to the inlet side of supply pump 102 at pressure Pb. Servo regulator 120 is responsible for dividing the total pressure differential from Psf to Pb between servos 104, 106. Indeed, as can be seen at FIG. 1, servo 104 receives an inlet flow at pressure Psf and produces an output flow which is regulated by servo regulator 120 to be at pressure Pr1. Servo regulator 120 is operable to recirculate some flow at pressure Pb back to the inlet side of supply pump 102. Servo regulator 120 also provides an output flow at pressure Pr2 to servo 106. Pressures Pr1 and Pr2 are each regulated to be sufficient to operate servos 104, 106, respectively.

With the above configuration, the pumping system and particularly the supply pump is no longer required to be sized to provide the total flow required to operate each servo 104, 106. All or some portion of the leakage flow from servo supply to drain that is used to hydraulically operate servo 104 is recirculated to supply the servo 106. In other words, the drain flow from servo 104 is used to supply servo 106. It has been observed that this significantly reduces the amount of pump flow required to supply the servos 104, 106.

In the illustrated embodiment, servos 104, 106 may be responsible for controlling the metering position of one or more FMV's 110, or alternatively, may be responsible for actuator control, cooling functionality, etc. Regardless of the end use of servos 104, 106, it will be recognized that the flow demands of servos 104, 106 and a fuel metering system 116 for metering fuel in a combustion engine are met by pump 102. However, in other embodiments as described below, pump 102 may be a dedicated pump for supplying the entirety of its flow for servo control only.

As can also be seen at FIG. 1, a discharge pressurizing valve 112 is connected to an outlet side of FMV 110. As will be understood by those skilled in the art, FMV 110 and pressurizing valve 112 form part of metering system 116, which may include other componentry not limiting on the embodiments described herein. Indeed, metering system 116 may include multiple metering circuits, each of which may incorporate one or more FMV's, requiring servo control by one or more EHSV's. A bypass valve 114 is responsible for bypassing an unused portion of the fuel flow provided by supply pump 102 to metering valve 110 back to the inlet side of supply pump 102 at pressure Pb.

Figure 2:
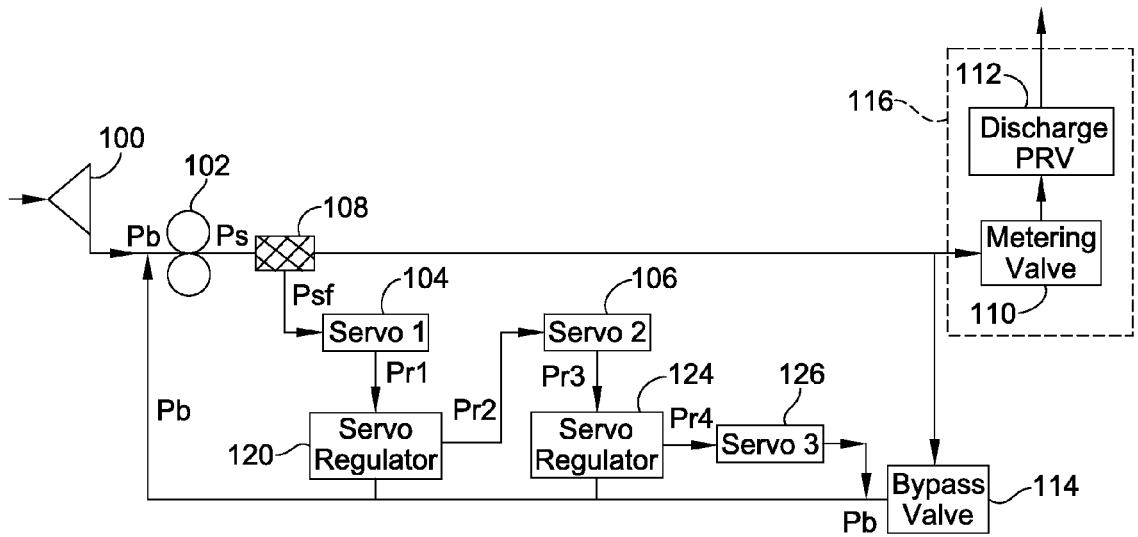
FIG. 2 is a schematic representation of a second embodiment of a fuel circulation system according to the teachings of the present invention.

The embodiment shown in FIG. 2 is substantially the same as that shown in FIG. 1 but for the inclusion of an additional flow regulation device in the form of servo regulator 124, and servo 126 which again may be indicative of a single servo or a group of servos. Servo regulators 120, 124 are responsible for dividing the overall pressure drop between Psf and Psb to ensure sufficient operation of each of servos 104, 106, 126.

Figure 3:
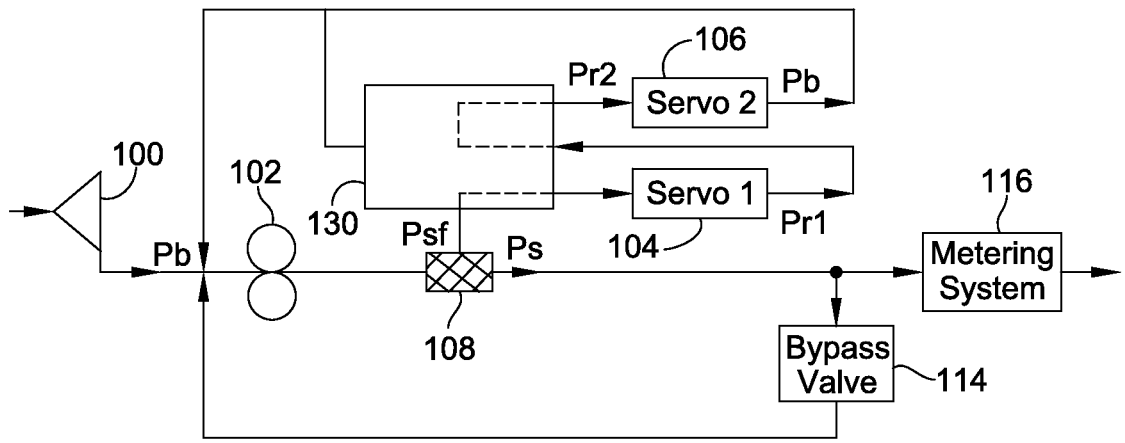
FIG. 3 is a schematic representation of a third embodiment of a fuel circulation system according to the teachings of the present invention.
Figure 4:
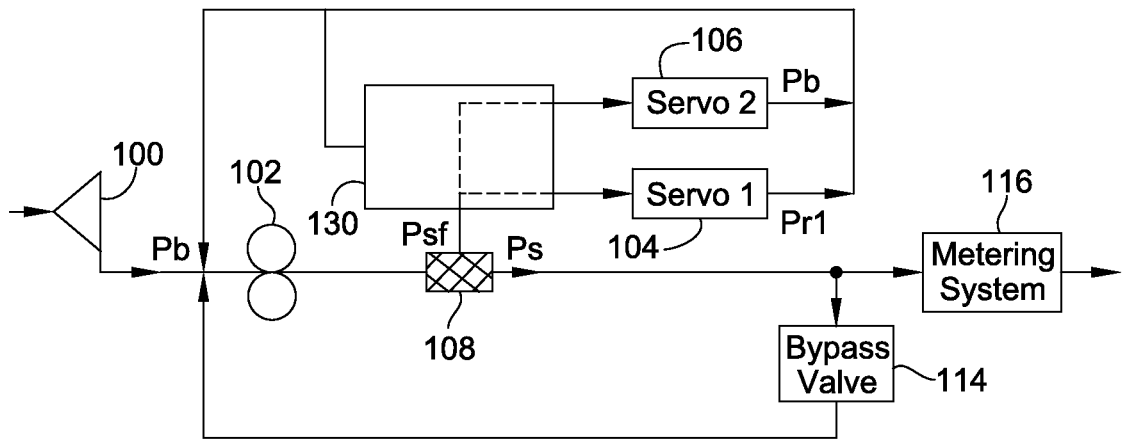
FIG. 4 is a schematic representation of a fourth embodiment of a fuel circulation system according to the teachings of the present invention.

The embodiment shown in FIGS. 3 and 4 is substantially similar to the embodiments described above, except that it also includes flow regulation device in the form of a combination pressure regulator and flow switching device (CRS) 130 which is operable to switch the flow through servos 104, 106 between a series flow as that described above and a parallel flow. Such a configuration is highly advantageous when it is desirable to reduce servo leakage at relight and it is also desirable to provide full hydraulic force to servos 104, 106 for conditions beyond relight.

When configured in parallel mode as shown in FIG. 4 by way of CRS 130, servos 104, 106 are supplied with the total available pressure differential Psf to Pb to maximize the available servo force. When configured in series mode as shown in FIG. 3 by way of CRS 130, servos 104, 106 are supplied with a portion of the total available pressure differential as described above. Additionally, the embodiment shown in FIGS. 3 and 4 may include additional servos and/or combination pressure regulator and switches based upon systemic needs.

Figure 5:
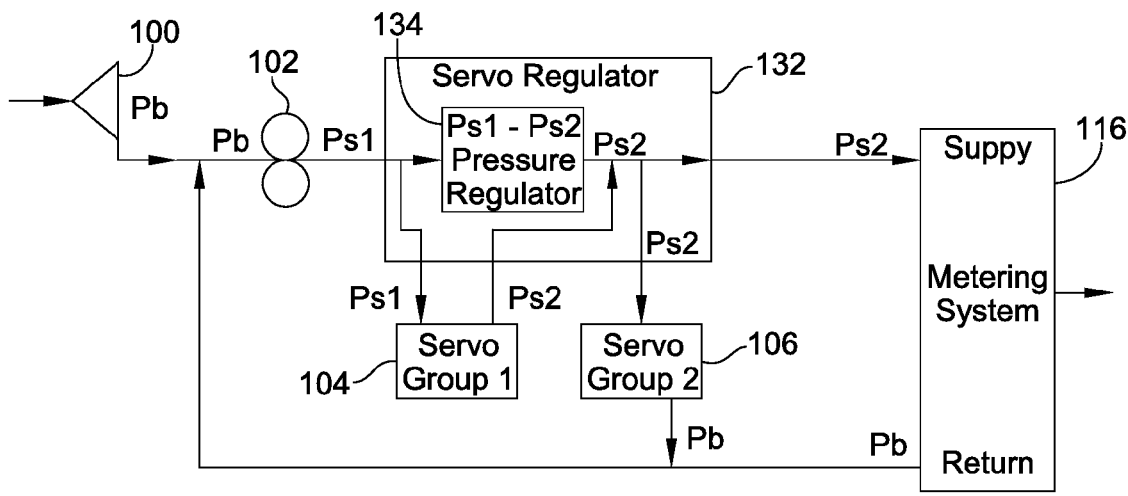
FIG. 5 is a schematic representation of a fifth embodiment of a fuel circulation system according to the teachings of the present invention.
Figure 6:
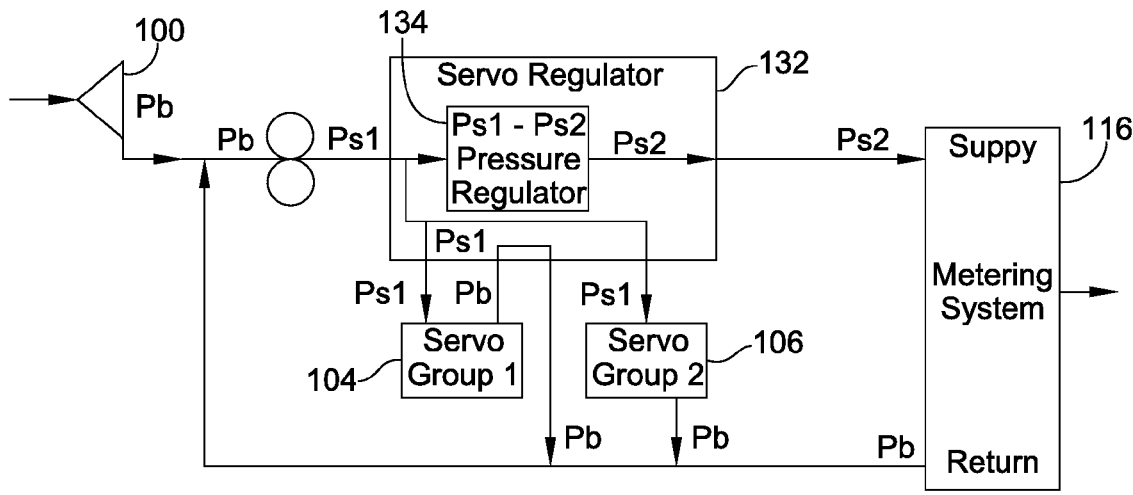
FIG. 6 is a schematic representation of a sixth embodiment of a fuel circulation system according to the teachings of the present invention.

The embodiment shown in FIGS. 5 and 6 is similar to that shown in FIGS. 3 and 4 in that it includes a flow regulation device in the form of CRS 132. CRS 132 includes an inline pressure regulator 134 (also referred to as an inlet pressurizing valve) in the main metering system flow path. Inlet pressurizing valve 134 is used to create the pressure differential to operate servo 104. When is series mode as shown in FIG. 5, the return flow from servo 104 is returned to the main flow path and is used to supply metering system 116 and servo 106. When in parallel mode as shown in FIG. 6, CRS 132 supplies servos 104, 106 with the available pressure differential Psf to Pb to maximize available servo force.

Figure 7:
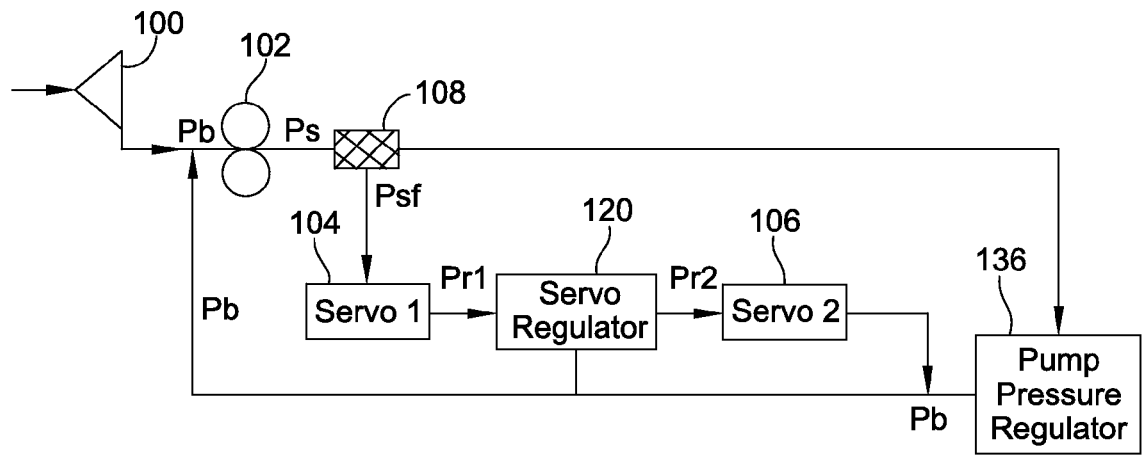
FIG. 7 is a schematic representation of a seventh embodiment of a fuel circulation system according to the teachings of the present invention.
Figure 8:
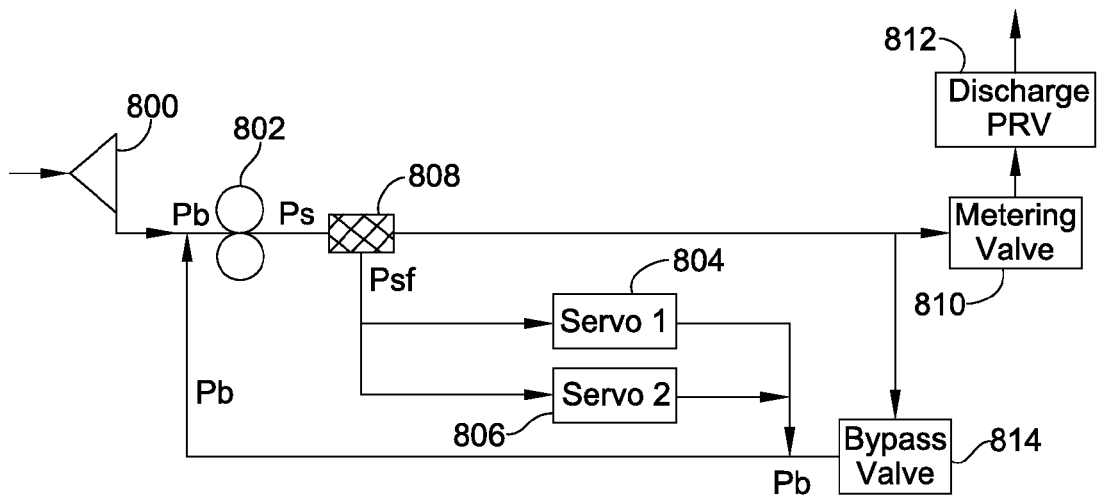
FIG. 8 is a schematic representation of a conventional engine fuel system.

The embodiment shown in FIG. 7 is similar to that described above, except that the outlet flow of pump 102 is dedicated for supplying servo flow only. In other words, a portion of the outlet flow of pump 102 is also not provided to a metering system, such as the embodiment shown in FIG. 1. This embodiment may employ any of the features and functionality described relative to FIGS. 1-6. This embodiment also employs a pump pressure regulator 136 which receives a portion of the outlet flow of fuel from pump 102, that is ultimately returned to the inlet of pump 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel circulation system, comprising:
a supply pump for providing an outlet flow of fuel:
at least a first and a second electro-hydraulic servo valve (EHSV), the first EHSV connected to an outlet of the supply pump, and
a flow regulation device interposed between the first and second EHSVs, wherein at least a portion of the outlet flow of fuel is directed through the first and second EHSVs and the flow regulation device and is returned to an inlet side of the supply pump;
wherein the first. EHSV, flow regulation device, and second EHSV are connected in series;
wherein the flow regulation device is a pressure regulator that regulates an output flow from the first EHSV at a first pressure and provides an output flow to the second EHSV at a second pressure; and
wherein the flow regulation device is operable to bypass a portion of the outlet flow from the first EHSV back to the inlet side of the supply pump.

2. A fuel circulation system, comprising:
a supply pump for providing an outlet flow of fuel;
at least a first and a second electro-hydraulic servo valve (EHSV), the first EHSV connected to an outlet of the supply pump; and
a flow regulation device interposed between the first and second EHSVs, wherein at least a portion of the outlet flow of fuel is directed through the first and second EHSVs and the flow regulation device and is returned to an inlet side of the supply pump;

wherein the flow regulation device is a combined pressure regulator and switching device operable to change a flow path from the supply pump through the first and second EHSVs between a first and a second flow configuration such that, in the first flow configuration, the first and second EHSVs are arranged in series with one another, and in the second configuration, the first and second EHSVs are arranged in parallel with one another.

3. A fuel circulation system comprising:
a supply pump for providing an outlet flow of fuel;
a plurality of electro-hydraulic servo valves (EHSVs) arranged in series with one another in a first configuration, wherein a portion of the outlet flow of fuel passes through the plurality of EHSVs and is recirculated to an inlet side of the supply pump; and
a EHSV regulator interposed between each adjacent ones of the plurality of EHSVs;
wherein the EHSV regulator is a pressure regulator;
wherein the pressure regulator regulates an output flow from a first EHSV of the plurality of EHSVs in series with the first EHSV and the pressure regulator at a second pressure; and
wherein the pressure regulator bypasses a portion of the output flow from the first EHSV back to the inlet side of the supply pump.

4. The fuel circulation system of claim 3, wherein the second EHSV provides an output flow to the inlet side of the supply pump.

5. A fuel circulation system comprising:
a supply pump for providing an outlet flow of fuel:
a plurality of electro-hydraulic servo valves (EHSVs) arranged in series with one another in a first configuration, wherein a portion of the outlet flow of fuel passes through the plurality of EHSVs and is recirculated to an inlet side of the supply pump; and
EHSV regulator interposed between each adjacent ones of the plurality of EHSVs;
wherein the EHSV regulator is a combined pressure regulator and flow switching device, and
wherein the combined pressure regulator and flow switching device is operable to modify a flow path between a first EHSV of the plurality of EHSVs and a second EHSV of the plurality of EHSVs from the first configuration such that the first EHSV is arranged in parallel relative to the second EHSV.

6. A method for controlling a flow of fuel in a fuel circulation system, the method comprising the steps of:
supplying an outlet flow of fuel from a supply pump;
providing at least a portion of the outlet flow of fuel to a plurality of electro-hydraulic servo valves EHSVs that, in a first configuration, are arranged in series with one another,
regulating a pressure of an outlet flow of a first EHSV of the plurality of EHSVs with a pressure regulator interposed between the first EHSV and a second EHSV of the plurality of EHSVs and regulating a pressure of an inlet flow to the second EHSV with the pressure regulator;
bypassing a portion of the outlet flow from the first EHSV back through the pressure regulator back to an inlet side of the supply pump.

7. A method for controlling a flow of fuel in a fuel circulation system, the method comprising the steps of:
supplying an outlet flow of fuel from a supply pump;
providing at least a portion of the outlet flow of fuel to a plurality of electro-hydraulic servo valves EHSVs that, in a first configuration are arranged in series with one another;
modifying a flow path through the plurality of EHSVs such that, in a second configuration, they are arranged in parallel to one another.

8. The method of claim 7, wherein the step of modifying the flow path through the plurality of EHSVs includes modifying the flow path with a combined pressure regulator and flow switching device.

* * * * *